(12) United States Patent
Iwamura (10) Patent No.: US 7,594,118 B2
(45) Date of Patent: Sep. 22, 2009

(54) DATA-PROCESSING SYSTEM AND METHOD FOR CONTROLLING SAME, COMPUTER PROGRAM, AND COMPUTER-READABLE RECORDING MEDIUM

(75) Inventor: Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 794 days.

(21) Appl. No.: 11/208,807

(22) Filed: Aug. 22, 2005

(65) Prior Publication Data

US 2006/0047966 A1    Mar. 2, 2006

(30) Foreign Application Priority Data

Aug. 24, 2004    (JP)    ............... 2004-244129

(51) Int. Cl.
*H04L 9/00*    (2006.01)
(52) U.S. Cl. ..................................... 713/176
(58) Field of Classification Search .................. 713/176
See application file for complete search history.

(56) References Cited

U.S. PATENT DOCUMENTS

| | | | | |
|---|---|---|---|---|
| 5,499,294 A | * | 3/1996 | Friedman | ............. 713/179 |
| 6,272,225 B1 | * | 8/2001 | Miyauchi et al. | ............. 380/286 |
| 6,609,200 B2 | * | 8/2003 | Anderson et al. | ............. 713/176 |
| 2003/0152227 A1 | | 8/2003 | Javidi | |
| 2003/0163711 A1 | | 8/2003 | Grawrock | |
| 2004/0030909 A1 | | 2/2004 | Sako et al. | |
| 2005/0018854 A1 | | 1/2005 | Yamamoto et al. | |

FOREIGN PATENT DOCUMENTS

| | | |
|---|---|---|
| EP | 1256865 A | 11/2002 |
| EP | 1261212 A | 11/2002 |

* cited by examiner

*Primary Examiner*—Kambiz Zand
*Assistant Examiner*—Aubrey H Wyszynski
(74) *Attorney, Agent, or Firm*—Canon USA Inc IP Division (57) ABSTRACT

A data-processing system and method for controlling synthesizing digital-signature information. The system and method include holding first private-key information, inputting second private-key information, generating third private-key information based on the first private-key information and the second private-key information, holding the third private-key information, generating signature information based on information to be verified and the third private-key information, and outputting the information to be verified and the signature information.

8 Claims, 5 Drawing Sheets

DATA-PROCESSING SYSTEM AND METHOD FOR CONTROLLING SAME, COMPUTER PROGRAM, AND COMPUTER-READABLE RECORDING MEDIUM

BACKGROUND OF THE INVENTION

1. Field of the Invention

The present invention relates to a data-processing system and a method for controlling the data-processing system, and particularly relates to a technology for synthesizing digital-signature information.

2. Description of the Related Art

In recent years, digital cameras are rapidly becoming available. Images photographed by the digital cameras are now used in many fields, since they can be stored and kept, as electronic image data. Therefore, unlike known silver-salt photographs, the user of the digital camera does not have to develop and print an image photographed by the digital camera. Furthermore, the image is free from aging degradation, easy to be retrieved, and can be transmitted to a distant location via a communication line, as the image data.

Among the above-described fields, there are the non-life-insurance industry, wherein an accident is assessed by using photographed images of the damage conditions of an automobile involved in an accident, the construction industry, wherein a construction site is photographed for confirming the progress thereat, and wherein a building is photographed for confirming the specification thereof, and so forth. Ministry of Land, Infrastructure, and Transport (MLIT) of Japan has already permitted to use an image photographed by the digital camera for making the record of a civil-engineering-work site.

However, since a photographed image taken by the digital camera can be changed into digital data, the following problems have arisen. Namely, the photographed image can be easily changed and modified on a personal computer (PC) by using a commercially available photo-retouch tool, which is an application program. Since the digital data can be easily processed and/or modified, the reliability of the image photographed by the digital camera is considered to be lower than that of the image of a silver-salt photograph, particularly in the case where the image is used, as a photographic evidence of an accident, or attached to the report of the accident.

Although the image of a silver-salt photograph can be changed, such change is hardly made, since the cost of making the change is significantly higher than compensation obtained for the change, or the result of the change is unnatural, which makes a silver-salt photograph suitable to be used, as evidence. Therefore, there is apprehension that the above-described defect of an image photographed by the digital camera would be a great problem for the non-life-insurance industry and the construction industry in the future. Subsequently, a system configured to solve the above-described problem has been demanded.

At present, a system for detecting a change in image data by using digital-signature data synthesized by an encryption technology is disclosed in U.S. Pat. No. 5,499,294.

The above-described system includes an image-generation device (a camera) configured to synthesize image data and an image-verification device configured to verify the integrity of the image data. In the image-generation device, predetermined calculation is executed based on private information unique to the image-generation device and data on an image photographed and digitized by the image-generation device, whereby digital-signature data (described later) which is information used for identifying the image data (detecting a change in the image) is synthesized. Then, the digital-signature data and the data on the image photographed and digitized by the image-generation device are externally transmitted from the image-generation device. The image-verification device performs verification by comparing data obtained by executing predetermined calculation to the image data to data obtained by executing the inverse of the calculation performed at the time where the digital-signature data is synthesized to the digital-signature data. Further, in the case of U.S. Pat. No. 5,499,294, a hash function (a compression function) and a public-key cryptosystem are used, for synthesizing the digital-signature data.

Here, a system configured to detect a change in an image by using a digital signature is considered, where the system is used for an image-synthesis unit such as a camera. The digital signature allows synthesizing signature data by using a private key, as is the case with the above-described known technology. The private key can be set according to the following two methods.

1. The user of the camera synthesizes the private key and sets it to the camera.
2. The manufacturer of the camera synthesizes the private key and sets it to the camera.

Subsequently, the following problems arise.

1. Since the user knows the private key, and is the very person who sets the private key, the image data can be changed only by the user. Therefore, there is no guarantee that the image photographed by the camera has not been changed, even though the above-described known technology had already succeeded in offering the guarantee.
2. If the manufacturer sets the private key, the user cannot know the private key so that a high degree of security is achieved. However, setting private keys to cameras so that each of the private keys is unique to the camera corresponding thereto makes the steps of manufacturing the camera complicated. Therefore, identical private keys should be set for all of the cameras. In that case, however, if the private key of one of the cameras is analyzed, the private keys of the other cameras may be analyzed.

SUMMARY OF THE INVENTION

Accordingly, the present invention provides a technology that allows reducing a load on a manufacturer and the leakage of a private key. Further, even though the private key is analyzed, the present invention allows preventing other devices from being damaged by the analysis.

According to an aspect of the present invention, there is provided a data-processing device including a holding unit arranged to hold first private-key information, an inputting unit arranged to input second private-key information, a private-key-information generating unit arranged to generate third private-key information based on the first private-key information and the second private-key information, and hold the third private-key information, a signature-information generating unit arranged to generate signature information based on information to be verified and the third private-key information, an outputting unit arranged to output the information to be verified and the signature information.

Further features of the present invention will become apparent from the following detailed description of exemplary embodiments with reference to the attached drawings.

DESCRIPTION OF THE EMBODIMENTS

Hereinafter, embodiments of the present invention will be described in detail with reference to the attached drawings. Components disclosed in the embodiments are provided by way of example. Subsequently, the components impose no limit to the scope of the present invention.

First Embodiment

First, digital signature will be described in detail.

The digital signature denotes authentication technology. Namely, data (data to be verified) and the digital-signature data corresponding thereto are transmitted from the transmission side and the data for verification is verified on the reception side by using the digital-signature data, whereby the validity of the data is confirmed.

Usually, a hash function and a public-key cryptosystem are used for confirming the data validity, so as to synthesize the digital-signature data. Here, a private key of the public-key cryptosystem and a public key are defined as Ks and Kp, respectively, which will be described below.

On the transmission side, plain-text data (data to be verified) M is compressed by using hash function Ho so that an output h of a predetermined length is calculated. Namely, the calculation H(M)=h is performed. Next, the output h is converted by using the private key Ks so that the digital-signature data s is synthesized. Namely, the calculation D(Ks, h)=s is performed. Then, the digital-signature data s and the plain-text data M are transmitted to the verification side.

On the verification side, the digital-signature data s is converted by using the public key Kp. Namely, the calculation E (Kp, s)=E (Kp, D(Ks, h))=h" is performed. Further, transmitted plain-text data M' is compressed by using the hash function that is the same as that on the transmission side so that an output h' is calculated. Namely, calculation H(M')=h' is performed. When the outputs h' and h" agree with each other, it is determined that plain-text data M' is valid (M'=M).

When the plain-text data M is changed between the transmission side and the verification side, the output h" obtained by the calculation E (Kp, s)=E (Kp, D(Ks, h")) does not agree with the output h' obtained by compressing the transmitted plain-text data M' by using the hash function that is the same as that on the transmission side. Therefore, it is determined that the plain-text data M was changed. If the digital-signature data s is changed according to the change in the plain-text data M, the change cannot be detected. For making the above-described change, however, the plain-text data M has to be obtained according to the output h, which is impossible due to the one-wayness characteristic of the hash function.

Next, the hash function will be described. The hash function is used for increasing the speed of synthesizing the above-described digital signature. The hash function has the function of processing the plain-text data M of an arbitrary length and synthesizing the output h of a predetermined length. Here, the output h is referred to as the hash value (or either message digest or digital fingerprint) of the plain-text data M. The hash function should be one-wayness and collision-resistant. When the hash function is one-wayness, the calculation of the plain-text data M becomes difficult to perform in terms of the calculation amount, where the expression h=H (M) holds. Further, when the hash function is collision-resistant, and when the plain-text data M is known, the calculation of the plain-text data M' (M≠M') becomes difficult to perform in terms of the calculation amount, where the equation H(M)=H(M') holds. Further, the calculation of the plain-text data M and the plain-text data M' become difficult to perform in terms of the calculation amount, where the equations H(M)=H(M') and M≠M' hold.

Hash functions MD-2, MD-4, MD-5, SHA-1, RIPEMD-128, RIPEMD-160, and so forth are known and the algorithms thereof are on public view.

Next, the public-key cryptosystem will be described. The public-key cryptosystem is used for an encryption method wherein a code key (public key) and a decode key (private key) are different from each other, and the code key is on public view and the decode key is held in confidence. The public-key cryptosystem has the following characteristics.

(a) Since the code key is different from the decode key and the code key can be on public, the code key may not be transmitted in secrecy, which makes it easy to perform key transmission.

(b) Since the code key of each user is on public, the user has to memorize his/her own decode key only in secrecy.

(c) An authentication function that allows the reception side to confirm that the transmission side from which a communication sentence was transmitted is not spurious and the communication sentence is not changed.

For example, when an operation for encrypting the plain-text data M by using the public key Kp is determined to be E(Kp, M) and an operation for decrypting the plain-text data M by using the private key Ks is determined to be D(Ks, M), the public-key cryptosystem algorithm satisfies the following two conditions.

(1) When the public key Kp is known, the calculation E(Kp, M) can be easily performed. When the private key Ks is known, the calculation D(Ks, M) can be easily performed.

(2) When the private key Ks is not known, it becomes difficult to determine the plain-text data M in terms of the calculation amount, even though the steps of calculating the public key Kp and E( ), and C(=E(Kp, M)) are known.

Further, the following condition (3) is further set along with the above-described conditions (1) and (2) so that private communications can be performed.

(3) E(Kp, M) can be defined for every plain-text data M so that the equation D(Ks, E(Kp, M))=M holds. That is to say, even though any one can perform the calculation E(Kp, M), since the public key Kp is on public, only a user who owns the private Ks can obtain the plain-text data M by performing the calculation D(Ks, E(Kp, M)). On the other hand, the following condition (4) is further set along with the above-described conditions (1) and (2) so that authentication communications can be performed.

(4) D(Ks, M) can be defined for every plain-text data M so that the equation E(Kp, E(Ks, M))=M holds. That is to say, only the user who owns the private key Ks can perform the calculation D(Ks, M). If another person performs the calculation D(Ks', M) by using a false private key Ks' and disguises, as the user who owns the private key Ks, the calculation result becomes E(Kp, D(Ks, M))≠M. Therefore, it is confirmed that the transmitted information is invalid on the reception side. Further, if D(Ks, M) is changed, the calculation result becomes E(Kp, D(Ks, M)')≠M, so that it is determined that the transmitted data is invalid on the reception side.

Further, when the validity of the plain-text data M is confirmed, only a person who owns the private key Ks can synthesize D(Ks, M). Subsequently, it is determined that the user who owns the private key Ks signed the plain-text data M.

RSA code, R code, and so forth are known, as examples that allow performing the above-described private communications and authentication communications.

Here, encryption and decoding of the RSA code, signature synthesis, and signature verification that are most frequently used in these days are achieved by the following expressions.

Encryption: encryption key (e, n)
Encryption conversion $C=M^e \pmod n$
Decoding: decode key (d, n)
Decode conversion: $M=C^d \pmod n$
Signature synthesis: signature key (d, n)
Signature synthesis: $S=M^d \pmod n$
Signature verification: signature-verification key (e, n)
Signature verification $M=S^e \pmod n$ Here, the equation n=p·q holds, where p and Q denote large prime numbers different from each other. Further, e and d are integers fulfilling the following equations.

$$e \cdot d = 1 \pmod L$$

$$L = \mathrm{LCM}((p-1), (q-1))$$

Here, LCM (a, b) denotes the lowest common multiple of a and b.

Figure 1:
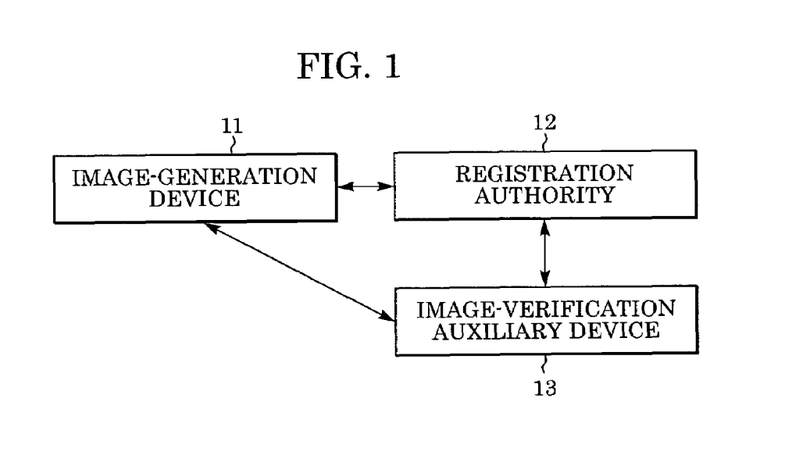
FIG. 1 illustrates an example configuration of an image-verification system according to an embodiment of the present invention.

FIG. 1 shows the configuration of a system according to the first embodiment. As shown in this drawing, the system includes an image-generation device 11 configured to synthesize image information for authentication and the digital-signature information thereof, a registration authority 12 that can communicate with the image-generation device 11, and an image-verification device 13.

The image-generation device 11 has the function of setting a private key for synthesizing a digital signature, the function of synthesizing image data and photographing an image, the function of synthesizing the digital signature corresponding to the synthesized image data, the function of synthesizing auxiliary parameters (where a camera is used, for example, photographing time, a focal length, an f number, the ISO sensitivity, metering mode, the image-file size, photographer's information, and so forth), the function of synthesizing an image file with the digital signature (including image data, the digital signature, an auxiliary parameter, and so forth), and the function of performing communications with the registration authority 12. Further, the image-generation device 11 can be, but is not limited to, an image-pickup device such as a digital camera, a digital-video camera, a scanner, and so forth, and electronic equipment including a camera unit. Hereinafter, the image-generation device 11 is used for a digital-still camera for the sake of simplicity.

The registration authority 12 has the function of verifying a user, the function of synthesizing a private key unique to a valid user and a public key that are paired off with each other according to a request transmitted from the valid user, the function of adding a public-key certificate to the public key and transmitting the public key and the public-key certificate to the valid user, the function of informing and releasing the public key of the registration authority 12. Further, in the present embodiment, the registration authority 12 is provided, as a personal computer (PC) that can perform communications via a network. The registration authority 12 is not limited to this implementation, and any entity that would enable practice of the present invention is applicable.

The image-verification device 13 has the function of separating the digital-signature-added image file, the function of verifying the digital signature separated from the image data, and the function of producing a display image of the verification result. Further, the image-verification device 13 can be, but is not limited to, a web server configured to store data, a PC configured to distribute the data, or a small apparatus including a CPU, a memory, and so forth. Hereinafter, the image-verification device 13 will be described, as the PC for the sake of simplicity.

Figure 2:
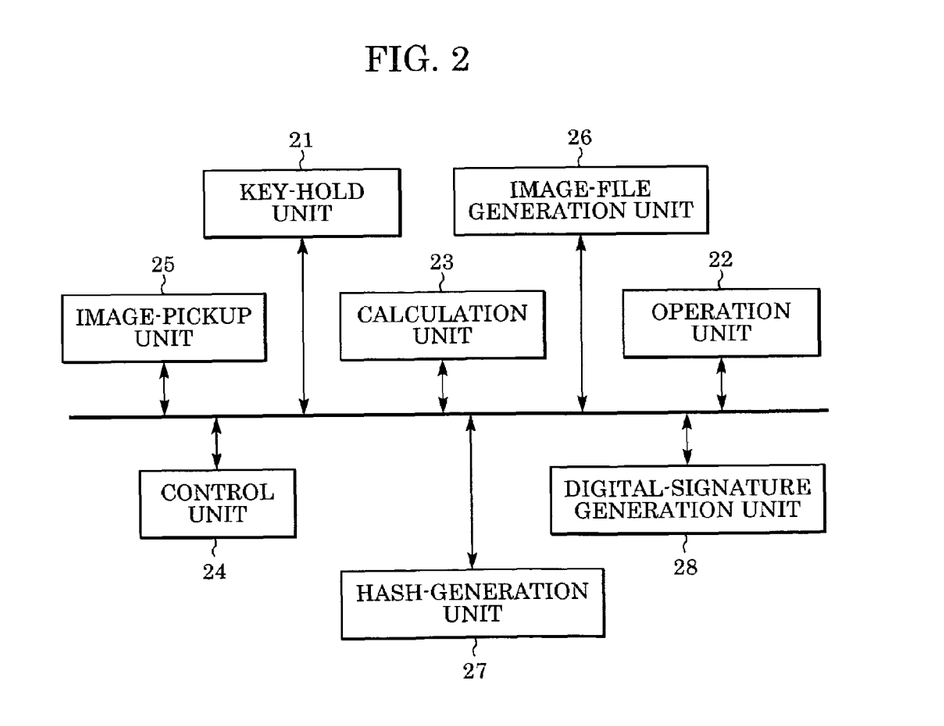
FIG. 2 is a block diagram illustrating the configuration of an image-generation device according to the embodiment.

FIG. 2 is a block diagram showing the configuration of the image-generation device 11 according to the first embodiment. In this drawing, an image-pickup unit 25 includes an optical lens and an image-pickup element, and a key-hold unit 21 includes a writable nonvolatile memory. A calculation unit 23 performs predetermined calculation according to a request transmitted from a control unit 24, which is configured to control the entire system, and an image-file generation unit 26 synthesizes an image file in a predetermined format based on a picked-up image and writes the image file into a removable memory card (not shown). An operation unit 22 includes a display unit (a liquid-crystal display or the like) configured to confirm the picked-up image and produce display images of various menus, switches, and buttons. The operation unit 22 functions as an interface between the system and a user. Further, a hash-generation unit 27, configured to calculate a hash value, and a digital-signature generation unit 28 are provided.

Figure 3:
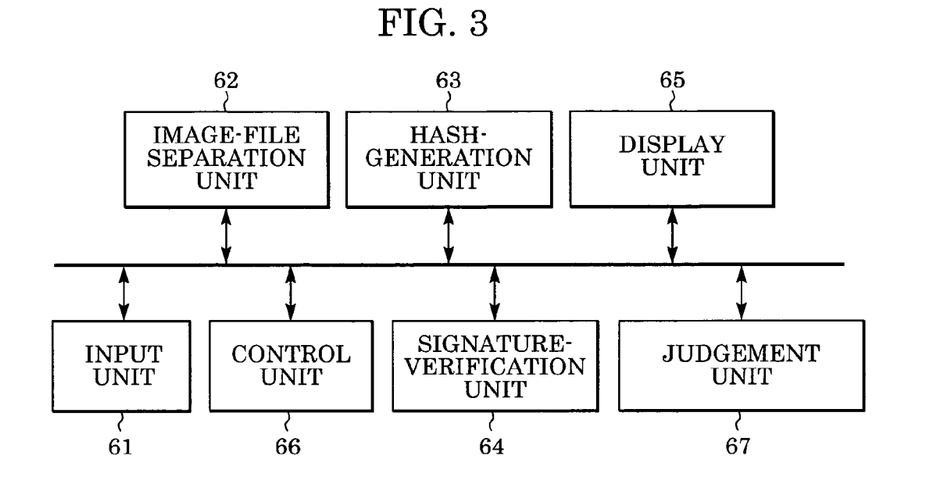
FIG. 3 shows the functional configuration of an image-verification device according to the embodiment.

FIG. 3 is a block diagram illustrating the functions of the image-verification device 13 according to the first embodiment. As described above, the image-verification device 13 is formed, as a PC. Since the configuration of a PC is not pertinent to the practice of the present invention, FIG. 3 only shows an example where a program configured to function as a verification device is executed. Namely, each of the function units shown in FIG. 3 is formed as a CPU and a program configured to perform the processing of the CPU.

FIG. 3 shows an image-file separation unit 62 configured to separate image data and signature data from an image file, a hash-generation unit 63, and a display unit 65 configured to produce a display image of a verification result (e.g., whether or not data is changed). FIG. 3 further includes an input unit 61 configured to transmit an image file for verification, where the input unit 61 functions as a network I/F when the image file is transmitted via a network or the like, and a card reader (not shown) for reading the image file from a recording medium such as a memory card. The drawing further includes a control unit 66 configured to control the entire system, a signature-verification unit 64, and a judgement unit 67.

Figure 4:
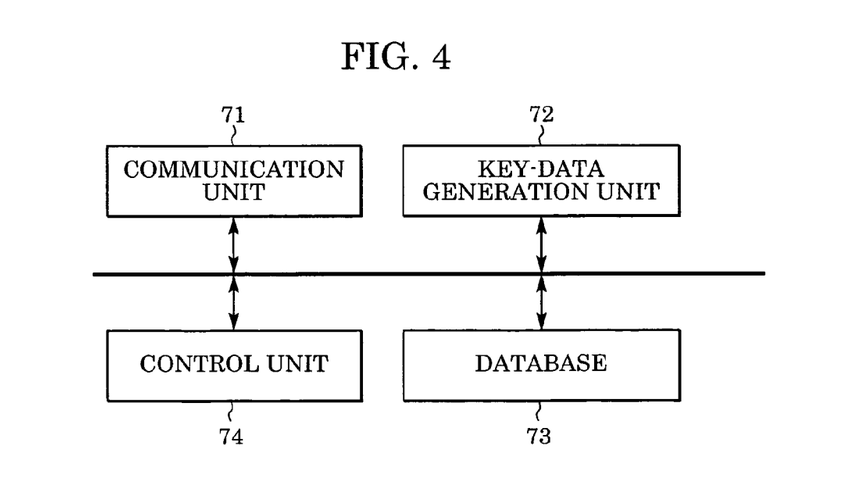
FIG. 4 shows the functional configuration of a registration authority according to the embodiment.

FIG. 4 is a functional block diagram showing the configuration of a registration authority 12 according to the first embodiment. FIG. 4 includes a communication unit 71 connected to the Internet for communicating with the PC of the user who owns the image-generation device 11, a key-data generation unit 72 configured to synthesize key information and a public-key certificate P that will be described later, a database 73 configured to store private keys d, described in more detail below, stored and held in the image-generation devices 11 by the manufacturer of each of the image-generation devices 11 and to store data used for making a validity check of a user when the user tries to access the registration authority 12. FIG. 4 further includes a control unit 74 configured to control the entire registration authority 12.

Figure 5:
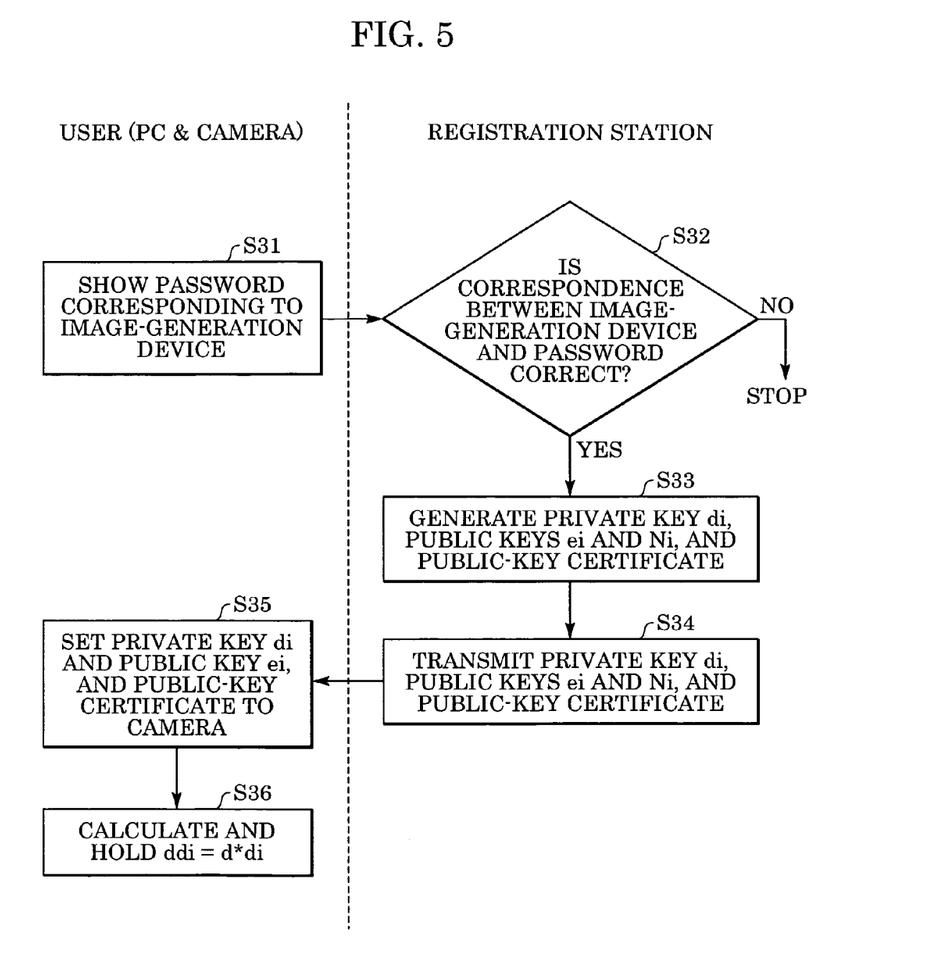
FIG. 5 is a flowchart illustrating private-key distribution processing according to the embodiment.

In the above-described system, processing for distributing a digital-signature private key to each of users is described according to the flowchart of FIG. 5. Here, the image-generation device 11 has the technique of performing safe communications with the registration authority 12. For example, an encryption-communication software program is provided as a bundled software program of the image-generation device 11, and a password is added to each of the image-generation devices 11, where the password is unique to the image-generation device 11. Further, the image-generation device 11 holds predetermined private information d in the key-hold unit 21 (e.g., a writable nonvolatile memory) installed during the manufacturing procedures. The private information d is common to all of the image-generation devices 11 provided by the image-generation device's manufacturer. The registration authority 12 also holds the private information d in the database 73 so that the user of the image-generation device 11 is not informed of the existence of the private information d.

In the present invention, each of the private information d and specifiers ei, di, and Ni indicates a numerical value that is set as a numerical value having a predetermined bit length.

Turning to FIG. 5, in step S31, a user installs the bundled software onto the user's PC, provides a safe communication path between the PC and the registration authority 12, and provides the password corresponding to the ID of the image-generation device 11 to the registration authority 12. Next, in step S32, the registration authority 12 stores a list of correspondence between the IDs of the image-generation devices 11 and the passwords in the database 73 and confirms the validity of the password. If it is determined that the password is not valid, the registration authority 12 stops the processing. Otherwise, flow proceeds to step S33, where the registration authority 12 controls the key-data generation unit 72 so that user "i" synthesizes a private key di, public keys ei and Ni, and the public-key certificate P satisfying the relationship between equations (1) and (2):

$$di \times d \times ei = 1 \mod \Phi(Ni) \quad \text{Equation (1)}$$

$$\Phi(Ni) = LCM((p-1)(q-1)) \quad \text{Equation (2)}$$

Here, p and q denote prime numbers. Further, the public-key certificate P certifies the validity of a user's public key. Here, the key certificate P is signed by using the private key of the registration authority 12.

Then, in step S34, the private key di, the public keys ei and Ni, and the public-key certificate P are transmitted to the user through the safe communication path. The above-described information items transmitted to the image-generation devices 11 that are of the same type and that are provided by the same manufacturer are different from each other. Subsequently, the private key di, the public keys ei and Ni, and the public-key certificate P are synthesized so that the relationship between the equations (1) and (2) are satisfied. Further, the private key di, the public keys ei and Ni, and the public-key certificate P are synthesized based on, but not limited to, random numbers, the name and address of the user, a password used by the user for making application to the registration authority 12, and so forth.

Upon receiving the various information items transmitted from the registration authority 12 in the above-described manner, an application program installed on the user's PC produces a display image of the information items that are shown based on the hexadecimal system, whereby a message including a message prompting the user to set the transmitted information to the image-generation device 11.

In step S35, the user sets the private keys di, the public keys ei, and the public-key certificate P to the key-hold unit 21 by operating the operation unit 22 shown in FIG. 2. As a result, the control unit 24 performs the calculation ddi=d×di at the calculation unit 23 by using the private key d that is stored in the key-hold unit 21 and that is not released to the user, and the transmitted private key di. Then, in step S36, the control unit 24 stores the calculation result in the key-hold unit 22.

The key-hold unit 21 is provided as a memory from which no data can be read and transmitted to any external unit except the calculation unit 23 and the digital-signature generation unit 30, so as to prevent leakage of the key-information. The calculation unit 23 includes at least a CPU, a RAM, a ROM, a special-purpose IC chip, and performs predetermined calculations.

Next, normal image-pickup processing performed by the image-generation device 11 according to the first embodiment will be described. Here, the image-generation device 11 is used for a camera, so that AF processing procedures and AE processing procedures are performed. Since the AF and AE processing procedures have no direct bearing on the present invention, the details thereof will not be described. However, processing procedures performed after a shutter button of the operation unit 22 is pressed will be described according to a flowchart shown in FIG. 6.

Figure 6:
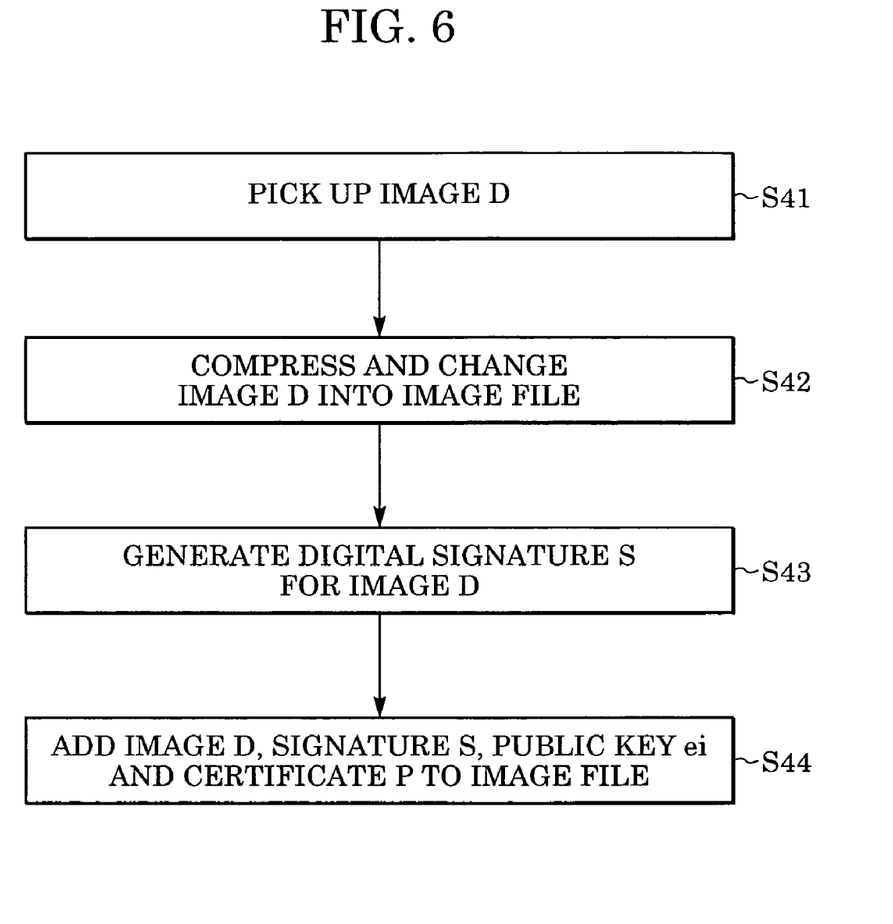
FIG. 6 is a flowchart illustrating digital-signature synthesis processing performed by the image-generation device according to the embodiment.

First, in step S41, the operation unit 22 is operated so that the image-pickup unit 25 synthesizes picked-up image data D. Then, in step S42, the image-file generation unit 26 converts the picked-up image data D into a file compressed and encoded by compression-and-encoding processing based on the known JPEG standards.

Flow then proceeds to step S43, the data on the compressed image file is transmitted to the hash generation unit 27 so that the hash value h is generated and the digital-signature generation unit 28 performs calculation by using the private key ddi stored in the key-hold unit 21 and synthesizes the digital signature s. Next, in step S44, the control unit 24 inserts the synthesized digital signature S, the public keys ei and the public-key certificate P into a predetermined area (e.g., the header portion) of the image file synthesized by the image-file generation unit 26 and stores the image file in a memory card (not shown). That is to say, at step S44, an image D, a digital signature S, the public keys ei, and the public-key certificate P are generated as a single file.

Here, the image-pickup unit 25 includes an optical sensor such as a charge-coupled device (CCD) and synthesizes the image data and auxiliary parameters of an object according to an instruction transmitted to the operation unit 22. Further, the image file synthesized by the image-file generation unit 26 may be based on any one of the JPEG file interchange format (JFIF), the tagged image file format (TIFF), graphics interchange format (GIF), formats obtained by expanding the above-described formats, or other image-file formats. Further, generally known hash functions such as MD5, SHA1, RIPEMD, and so forth are used as the hash function H employed by the hash-generation unit 27. The digital-signature generation unit 28 includes a CPU configured to perform signature-synthesis processing by using the above-described RSA code and a memory including a RAM, a ROM, and so forth configured to store key information required by the CPU. The control unit 24 controls the above-described processing procedures.

Next, digital-signature verification performed by the image-verification device 13 will be described according to the flowchart shown in FIG. 7.

FIG. 1 shows a bi-directional arrow extending from the image-generation device 11 to the image-verification device 13, which indicates that an image file is transmitted therebetween via communications and/or a recording medium.

Figure 7:
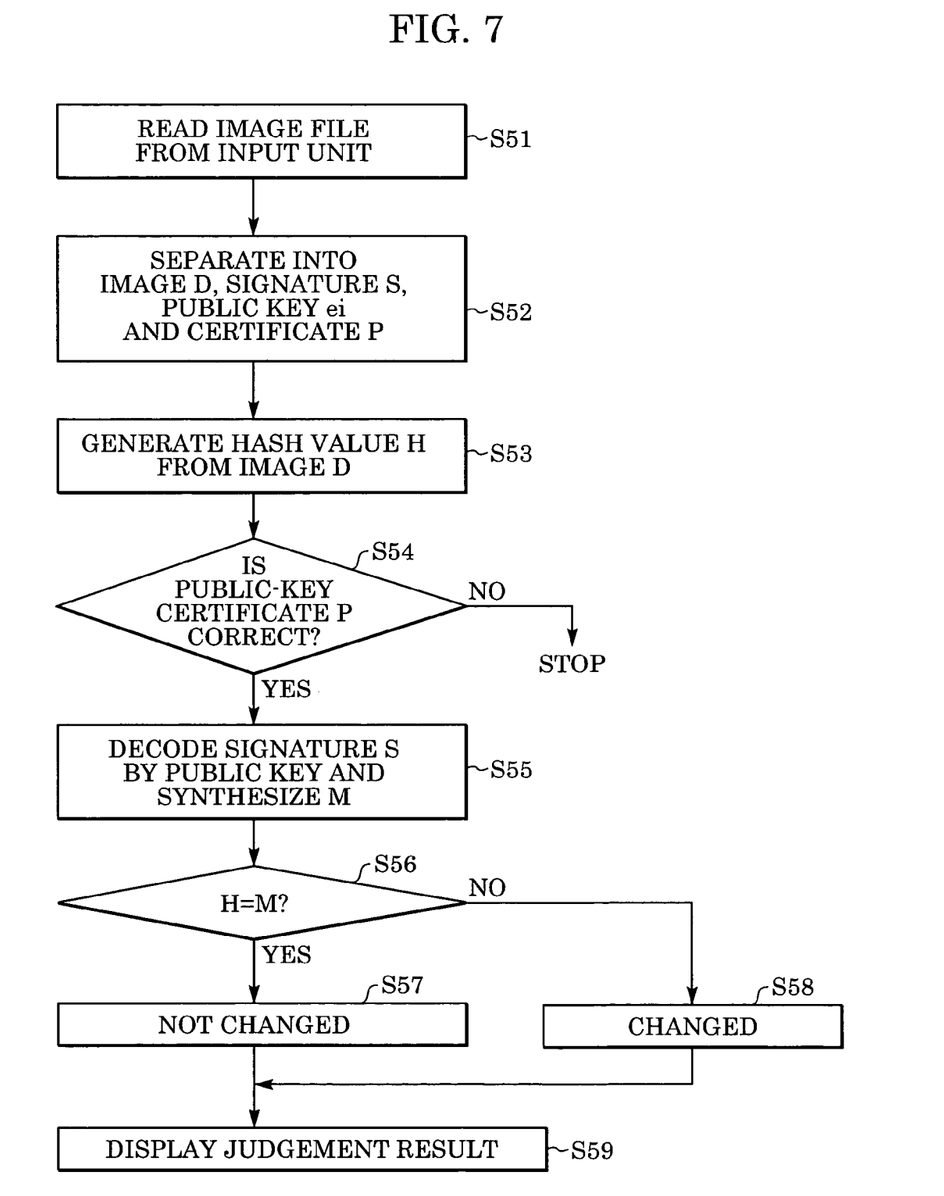
FIG. 7 is a flowchart illustrating digital-signature verification processing performed by the image-verification device according to the embodiment.

Turning to FIG. 7, first, in step S51, an image file including an image D, a digital signature, the public keys ei and the public-key certificate P is read from the input unit 61. Then, in step S52, the image-file separation unit 62 separates the image D, the digital signature, the public keys ei and the public-key certificate P from the read image file.

Next, in step S53, the hash-generation unit 63 synthesizes the hash value H from the image D.

Flow then proceeds to step S54, where the image-verification device 13 tests the separated public-key certificate P by using a public key released by the registration authority 12 in the signature-verification unit 64.

If the verification result is not correct, the display image of a message or the like indicating that the public-key certificate P failed the verification is produced, whereby the digital-signature verification is terminated.

If the verification result is correct, flow proceeds to step S55, where the separated digital signature S is decoded by the signature-verification unit 64 by using the public key ei. Then, in step S56, the hash value H calculated at step S53 is compared to a value M decoded at step S55 by the judgement unit 66. When the hash value H agrees with the value M, flow proceeds to step S57, where it is determined that there is no change. Otherwise, flow proceeds to step S58, where it is determined that there is a change. Finally, in step S59, a display image of the judgement result is produced on the display unit 65 such as a monitor. For example, when the judgement unit 66 determines that there is no change, a display image "not changed" is produced, and when the judgement unit 66 determines that there is a change, a display image "changed" is produced.

Thus, according to the first embodiment, when the user of the image-generation device 11 transmits a registration request to the registration authority 12, the private key di unique to the user and the public keys ei and Ni, and the public-key certificate P are transmitted and the result is set to the image-generation device 11. At that time, the user is informed of the private key di. The control unit 24 of the image-generation device 11 synthesizes the private key ddi according to the private keys d and di prepared by the manufacturer in advance so that the private key ddi is used for synthesizing a digital signature. Therefore, only the registration authority 12 knows the private key ddi.

If a third party having the image-generation device 11 whose model and manufacturer are the same as those of the above-described image-generation device 11 transmits a registration request to the registration authority 12, a private key dj, public keys ej and Nj, and the public-key certificate P are transmitted to the third party. The private key synthesized by the image-generation device 11 is indicated by the specifier ddj so that the private keys ddi and di are kept a secret.

The first embodiment of the present invention allows reducing a load on a manufacturer and the leakage of a private key. Further, even though the private key is analyzed, the first embodiment allows preventing other devices from being affected by the analysis.

Other Embodiments

Other embodiments will be described below. According to the first embodiment, the digital signature is synthesized only for the image data on an object. However, digital-signature data can be synthesized for information, e.g., metadata of the image data, such as the auxiliary parameters including the photographing time, the focal length, the f number, the ISO sensitivity, the metering mode, the image-file size, the photographer's information, and so forth. In that case, the digital-signature data can also be synthesized by the same mechanism as is the case with the image data and the digital-signature verification can also be performed for the auxiliary parameters.

Since each of the image data and the metadata is binary data, the digital-signature verification can be achieved by replacing the image data with the metadata. That is to say, the digital-signature verification can be achieved by transmitting the metadata to the hash-generation unit 27 in place of the image data. This data change is achieved by the control unit 24. Therefore, the image D described in FIGS. 6 and 7 should be replaced with the auxiliary parameters. Subsequently, it becomes possible to detect not only changes in the image data, but also those in the metadata on an image.

In the first embodiment, the public-key certificate P is issued by the registration authority 12 for the sake of simplicity. However, a certificate authority established based on the widely known public-key infrastructure (PKI) may issue the public-key certificate P.

Further, according to the first embodiment, the private key di, the public key ei, and the public-key certificate P are set to the key-hold unit 21, at step S35. However, in another embodiment, only the private key di is set to the key-hold unit 21. In that case, the generated digital signature S is inserted into the predetermined area of the generated image file so that the image file including the image D and the digital signature S is generated, at step S44.

Further, according to the first embodiment, the image file including the image D, the digital signature, the public key ei, and the public-key certificate P is read, at step S51. However, it may be arranged that the image file including the image D and the digital signature S be read. In that case, the public-key certificate P tested at step S54 and the public key ei used at step S56 may be acquired from an external device (the certificate authority, the registration authority, and so forth). Further, where the image file including the image D and the digital signature S is read, at step S51, the image file is divided into the image D and the digital signature S, at step S52.

Thus, the embodiments of the present invention have been described. In the first and other embodiments, the image-generation device 11 (a digital-still camera) has been described as a device configured to synthesize information for verification. However, the present invention is not used only for the above-described device. Namely, the present invention can be used for any device configured to synthesize digital-signature data by using the above-described private key ddi, when data for verification is synthesized, or when the device synthesizes the data for verification.

An example of the above-described device will be described below.

A memory card is prepared as a USB device storing the private key d. The private key d stored in the memory card is set by the manufacturer of the device so that the user cannot access the private key d.

Then, when a document is generated by the PC, an application program for synthesizing the digital signature S is started. The application program synthesizes the private key ddi by using the private key d and the private key di transmitted from the registration authority 12, and synthesizes signature data on the document file and a single file.

Further, the above-described embodiments have been described based on the premise that the user of the image-generation device 11 has a PC. However, when the image-generation device 11 has a network-connection function, the present invention is not limited to the above-described embodiments. For example, a mobile phone or the like can be used for acquiring key information or the like.

Thus, even though hardware including a memory card or the like is required, the present invention can be used for an application program running on a PC. Usually, the application program is stored in a computer-readable recording medium such as a CD-ROM, set to a computer, and copied and installed onto a system, so as to be executable. Therefore, the above-described computer-readable recording medium is in the scope of the present invention.

In other words, the foregoing description of the embodiments has been given for illustrative purposes only and not to be construed as imposing limitation in every respect.

The scope of the invention is, therefore, to be determined solely by the following claims and not limited by the text of the specifications and alterations made within a scope equivalent to the scope of the claims fall within the true spirit and scope of the invention.

This application claims the benefit of Japanese Application No. 2004-244129 filed Aug. 24, 2004, which is hereby incorporated by reference herein in its entirety.

What is claimed is:

1. A data-processing device comprising:
   a holding unit arranged to hold first private-key information;
   an inputting unit arranged to input second private-key information;
   a private-key-information generating unit arranged to generate third private-key information based on the first private-key information and the second private-key information, and store the third private-key information;
   a signature-information generating unit arranged to generate signature information based on information to be verified and the third private-key information;
   an outputting unit arranged to output the information to be verified and the signature information;
   a database arranged to hold the first private-key information held in the hold unit provided in the data-processing device for registration;
   a unit arranged to acquire the first private-key information for the data-processing device for registration by referring to the database, where a registration request is transmitted via a network, generate the second private-key information according to a predetermined algorithm, and generate public-key information that corresponds to the third private-key information generated based on the first private-key information and the second private-key information; and
   a transmission unit arranged to transmit the generated second private-key information and public-key information to a request source.

2. A data-processing device according to claim 1, wherein the inputting unit inputs public-key information for verifying whether or not the information to be verified is changed, where the third private-key information is the private key information of the public-key information.

3. A data-processing device according to claim 2, wherein the inputting unit further inputs certificate information used for authenticating the public-key information.

4. A data-processing device according to claim 3, wherein the outputting unit outputs the information to be verified, the signature information, the public-key information and the certificate information as a single file.

5. A data-processing device according to claim 1, further comprising a generating unit for generating the information to be verified.

6. A data-processing device according to claim 1, further comprising an image-pickup unit, wherein data on a predetermined image picked up by the image-pickup unit is generated as the information to be verified.

7. A data-processing device according to claim 1, wherein the second private-key information is key information that varies from one user to another.

8. A data-processing device according to claim 7, wherein the first private-key information is not open to any of the users.

* * * * *